United States Patent
Martell et al.

(10) Patent No.: US 10,132,577 B2
(45) Date of Patent: Nov. 20, 2018

(54) ADIABATIC REFRIGERANT CONDENSER CONTROLS SYSTEM

(71) Applicant: Baltimore Aircoil Company, Inc., Jessup, MD (US)

(72) Inventors: Greg Martell, Baltimore, MD (US); Adam Sheer, Columbia, MD (US); Philip Hollander, Silver Spring, MD (US); Preston Blay, Silver Spring, MD (US); David Andrew Aaron, Reisterstown, MD (US)

(73) Assignee: BALTIMORE AIRCOIL COMPANY, INC., Jessup, MD (US)

( * ) Notice: Subject to any disclaimer, the term of this patent is extended or adjusted under 35 U.S.C. 154(b) by 1021 days.

(21) Appl. No.: 14/159,243

(22) Filed: Jan. 20, 2014

(65) Prior Publication Data
US 2015/0204626 A1 Jul. 23, 2015

(51) Int. Cl.
*F25B 39/04* (2006.01)
*F24F 11/02* (2006.01)
(Continued)

(52) U.S. Cl.
CPC .............. *F28F 27/02* (2013.01); *F24F 3/001* (2013.01); *F28B 9/04* (2013.01); *F28B 9/06* (2013.01); *F28B 11/00* (2013.01); *F28C 1/14* (2013.01); *F28C 3/08* (2013.01); *F28D 1/024* (2013.01); *F28D 5/00* (2013.01); *F28F 27/00* (2013.01); *F28F 27/003* (2013.01); *F24F 5/0035* (2013.01); *F24F 2001/0092* (2013.01);
(Continued)

(58) Field of Classification Search
CPC ............... F25B 39/04; F25B 2339/041; F25B 2339/047; F24F 5/0035; F24F 2001/0085; F24F 2001/0088; F24F 2001/0092
See application file for complete search history.

(56) References Cited

U.S. PATENT DOCUMENTS 4,637,225 A * 1/1987 Marshall .................. F24F 6/04
62/285
5,226,285 A * 7/1993 Dankowski ........... F24F 1/0007
165/95
(Continued)

FOREIGN PATENT DOCUMENTS

CA 2808810 A1 9/2013
EP 1698847 A1 9/2006
(Continued)

OTHER PUBLICATIONS

Trillium Series Condenser Brochure.
(Continued)

*Primary Examiner* — Jonathan Bradford
(74) *Attorney, Agent, or Firm* — AMSTED Industries Incorporated (57) ABSTRACT

An adiabatic condenser or fluid cooler is provided. A condensing or fluid cooling coil is provided. An adiabatic pad is provided wherein water can be used to cool the ambient air before entering or impacting the condensing or fluid cooling coil. Controls are provided that can adjust or eliminate the amount of water flowing over the adiabatic pad. The adiabatic pad may also be physically moved to allow ambient air to directly impact the condensing or fluid cooling coil.

36 Claims, 10 Drawing Sheets

(51) Int. Cl.
| | |
|---|---|
| *F28F 27/02* | (2006.01) |
| *F28D 1/02* | (2006.01) |
| *F28F 27/00* | (2006.01) |
| *F28C 3/08* | (2006.01) |
| *F28D 5/00* | (2006.01) |
| *F24F 3/00* | (2006.01) |
| *F28B 9/04* | (2006.01) |
| *F28B 9/06* | (2006.01) |
| *F28B 11/00* | (2006.01) |
| *F28C 1/14* | (2006.01) |
| *F24F 1/00* | (2011.01) |
| *F24F 5/00* | (2006.01) |
| *F24F 13/22* | (2006.01) |

(52) U.S. Cl.
CPC ... *F24F 2013/225* (2013.01); *F25B 2339/041* (2013.01); *F25B 2339/047* (2013.01); *Y02B 30/748* (2013.01)

(56) References Cited

U.S. PATENT DOCUMENTS

| | | | | |
|---|---|---|---|---|
| 5,273,687 | A | * | 12/1993 | Osborne .................. F28C 1/02 261/111 |
| 6,047,555 | A | | 4/2000 | Weng |
| 8,483,883 | B1 | * | 7/2013 | Watson .................. F24F 3/044 236/49.3 |
| 2005/0012230 | A1 | | 1/2005 | Kammerzell et al. |
| 2007/0187851 | A1 | | 8/2007 | Facius et al. |
| 2008/0018001 | A1 | * | 1/2008 | Kammerzell ......... F24F 5/0035 261/97 |
| 2008/0115921 | A1 | | 5/2008 | Hall et al. |
| 2010/0154448 | A1 | * | 6/2010 | Hay ......................... G06F 1/20 62/175 |
| 2010/0281896 | A1 | * | 11/2010 | Al Watban ............ F24F 5/0035 62/160 |
| 2011/0168354 | A1 | | 7/2011 | De Jong et al. |
| 2011/0289951 | A1 | * | 12/2011 | Furlong .................... F28B 1/06 62/171 |

FOREIGN PATENT DOCUMENTS

| | | |
|---|---|---|
| WO | 2005005905 A1 | 1/2005 |
| WO | 2007015281 A2 | 2/2007 |
| WO | 2010037164 A1 | 4/2010 |
| WO | 2015059038 A1 | 4/2015 |

OTHER PUBLICATIONS

Muller SH09 USA Manual.
Trillium Series Condenser Manual.
Australian Patent Office, Office Action dated Apr. 12, 2017, from corresponding Australian Patent Application No. 2014377663, 3 pages.
Canadian Patent Office, Office Action dated Feb. 8, 2018, from corresponding Canadian Patent Application No. 2936747, 4 pages.
Canadian Patent Office, Office Action dated Jun. 28, 2017, from corresponding Canadian Patent Application No. 2936747, 4 pages.
European Patent Office, European Search Report dated Oct. 17, 2017, from corresponding European Patent Application No. 14878671.8, 7 pages.
European Patent Office, Third Party Observations dated Jun. 22, 2017, from corresponding European Patent Application No. 14878671.8, 5 pages.
Korean Patent Office, Office Action and Translation dated Mar. 21, 2018, from corresponding Korean Patent Application No. 10-2016-7022757, 12 pages.
PCT International Search Report and Written Opinion dated Jan. 22, 2015, from corresponding PCT Patent Application No. PCT/US2014/062901, 10 pages.
Korean Patent Office, Decision to Grant a Patent dated May 30, 2018, from corresponding Korean Patent Application No. 10-2016-7022757.

* cited by examiner

Figure 10

ADIABATIC REFRIGERANT CONDENSER CONTROLS SYSTEM

BACKGROUND OF INVENTION

This invention relates to improvements in the design of an adiabatic condenser or fluid cooler. More specifically this details two new control modes; energy savings mode and water savings mode; which are designed to optimize the use of these resources based on cost and availability. This invention may be applied to units employing adiabatic saturation pads and also applied to units that employ any means to evaporate water (such as spray nozzles) before an indirect coil to reduce and cool the entering air temperature to the indirect coil.

Prior art adiabatic control systems use a combination of water and electrical energy to provide the necessary cooling required. Electrical energy is used to drive the fans, which moves air through the coil(s). Water is used to wet the adiabatic material and lower the temperature of the air passing through the coil. This prior art system saves energy over an air cooled system and saves water over an evaporative system by using the combination of resources. Typical prior art condensers or fluid coolers can switch from dry to wet operation at a certain preset outdoor temperature or preset temperature or pressure condition; however, the prior art systems do not allow the savings of either water or energy resource to be optimized.

This invention allows the system to reduce the usage of the customer chosen resource (either water or energy) to the minimum level possible while still meeting the cooling demand. The system will favor the resource, either energy or water, that is less costly or less scarce at a given time. For example, if energy is determined to be scarcer or more costly, the system will use water whenever possible to minimize energy use. If water is the scarcer or more costly resource, then the system will use water only when necessary to meet the heat rejection target.

This invention also includes multiple methods for switching between the modes of operation. Mode selection can occur manually by changing a setting in the controls or can also be automated to provide the lowest utility usage cost for the user. Utility rates for electricity and water can be provided either manually or automatically via communications. With this information, the controls can determine the mode of operation that provides the lowest cost of ownership to the customer.

Another method for switching between modes is to accept a peak demand signal from a utility provider. This signal may be manually input or automatically sent by the utility. When this signal is triggered, it would cause the unit to favor the resource that is not currently in peak demand (typically electrical energy). This method of control would help to conserve scarce regional resources as well as reducing peak demand charges for the user.

For units employing adiabatic saturation cooler pads, this invention also includes the ability to increase the airflow through the coil when operating "dry". When running in the dry mode, the prior art product has a penalty of pressure drop through the adiabatic pads and consequently having reduced airflow through the unit. By bypassing air flow around the pads during dry operation, more airflow may be achieved thereby reducing fan motor energy usage and allows more conserving of water for longer periods of time.

Another feature of this invention is a coil cleaning program. This feature runs the fans backwards to force air through the coil in the opposite direction to force dirt and other debris out of the coil fins to improve the efficiency of the coil. This coil cleaning feature can be combined with a spray system on the coil to improve the cleaning. It can also be combined with the air bypass system so that any material blown out of the coil is blown clear of the unit. The pads could also be wet during cleaning mode to rinse debris that comes off the coil down into the sump other than onto the ground.

SUMMARY OF THE INVENTION

The product is an adiabatic condenser or fluid cooler with aluminum micro channel or copper/aluminum fin/tube heat exchangers, adiabatic heat transfer pads, speed-controlled fans, integral pump, and microprocessor-based control system. It should be noted that this invention can be used with any style unit employing the evaporation of water to cool the air before it reaches indirect heat exchange coils. Further the air may be blown through or pulled through the unit and is not a limitation of the invention. Further, the materials of construction may be any material used in the art and is not a limitation to this invention. It should also be noted that the method of delivering air to the unit is not a limitation to the invention. It should also be noted that the indirect coils may be mounted in an "A", "V", horizontally or vertically mounted or be single or multiple coils and that any indirect coil orientation known in the art can be used and is not a limitation of this invention. The control system is enhanced with the design described below. However, this invention can also be applied to any adiabatic condenser, any adiabatic fluid cooler.

Two modes of operation are possible for the inventive system. The first mode is described as the energy savings mode. Prior art adiabatic operation is controlled by an outdoor temperature set point. When the outdoor temperature exceeds this set point, the wet mode is initiated regardless of whether it is needed or not. This method of control is referred to as standard mode. A new inventive energy savings mode is presented that, in order to save electrical energy usage, will turn the wet operation on as soon as the temperature is high enough to prevent water freezing on the adiabatic pads. With wet operation running at a much lower temperature than with the standard mode, cooler air will be entering the coil driving system head pressure lower than otherwise obtained without wet operation and the variable speed motor driven fans may run at a slower speed thereby reducing energy consumption from the compression system and/or cooler fans. Overall energy consumption is reduced when compared to the prior art standard mode.

The second mode of operation is the water savings mode. This method of control keeps wet operation off until it is necessary to meet the heat rejection requirement. Only once the capacity of the unit has been maximized in dry operation and the variable speed motor driven fans are at full speed (set point is adjustable), the wet cooling operation will be turned on to increase heat rejection capacity. Delaying the wet operation until absolutely necessary will minimize the amount of water used by the unit. Overall water consumption is reduced when compared to the prior art standard mode.

The prior art adiabatic condenser (or fluid cooler) utilizes a periodic pan dump cycle which removes the recirculated water from the unit and replaces it with fresh water, thus keeping the water chemistry in the unit near that of the water supply and eliminating maintenance associated with scale deposits or algae or biological growth. In prior art, the dump cycle would occur on a predetermined schedule regardless of how high or low the mineral content of the water was in the unit—and to prevent potential fouling, was set to a regular schedule that represented an assumption of poor water quality. The proposed water savings mode can also be combined with a "water saver feature" to further reduce water use. This water saver feature includes a water quality sensor that will measure the conductivity of the water in the unit and only dump the water only when the level of solids reach a predetermined level. It should be noted that the water quality sensor can be conductivity or any other means of determining water quality and is not a limitation of this invention. This addition prevents clean water (that can still be used) from being wasted in regions where the supplied water is of good quality. Essentially all prior art water quality water dump systems on cooling tower related products check water conductivity and dump a small portion of water (called bleed-off) while the system is running (also called blow-down). The present water savings mode is different in that the entire pan water is dumped and flushed, and it is essential to not do this unless it is indicated by water conductivity for water savings.

This invention also includes multiple methods for selecting the mode of operation. The most basic way is for the user to select the mode manually in the control system. There are also automated selection methods available. The control system can choose the mode of operation to minimize the energy usage. To do this, the control system needs inputs related to the cost for electricity and water. This information can either be entered manually into the control system, or it can be communicated electronically via a communications protocol. Once the control system has this information, it can calculate the cost of running in energy savings mode and water savings mode and determine which mode provides the lowest overall operating cost to the user. This decision can be continually updated based on changing cost information.

Another method for switching modes is to do so based on a peak demand signal from utility providers. This signal would let the unit know that either electricity or water is in high demand, and that the high demand resource should be conserved. For example, if the electric utility sent a peak demand signal, the controls could switch to energy savings mode to conserve electricity. This method of mode control helps to reduce the strain on utility systems. It also helps the user by lowering possible peak demand charges as much as possible.

Figure 4:
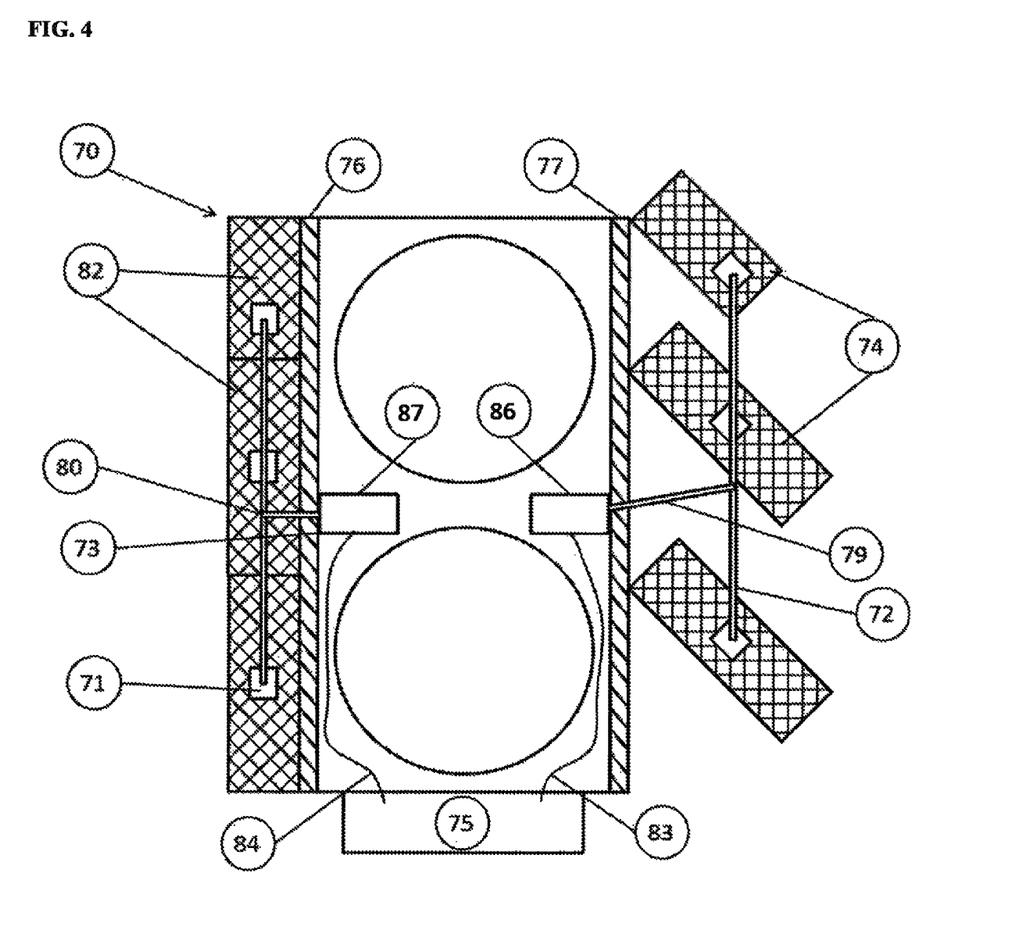
FIG. 4 is a top view of an embodiment of an adiabatic condenser showing swing away pads.

For units employing adiabatic pads, this invention also includes the ability to increase the airflow through the coil when operating "dry". When running in the dry mode, the prior art product has a penalty of pressure drop through the adiabatic pads and consequently having reduced airflow through the unit. In the present invention, the ability to bypass air flow around the pads during dry operation, more airflow may be achieved thereby reducing fan motor energy usage and allows for less water consumption for longer periods of time. This bypass air flow around the adiabatic pads may be achieved by physically moving the adiabatic pads so fresh air flows easily around the pads. Alternately, the bypass air may enter the dry coil by opening air bypass dampers which allows fresh air to enter between the coils and pads. In this embodiment, the pads are spaced away from the coil and dampers are placed above and in-between the pads and coils to control a side stream of air that can bypass the pads. In the rotating or swing away pad embodiments, the pads themselves are contoured to open so they can open without interfering; when closed they tightly nest to force the air to flow through the pads and maintain a pressure drop across the unit to ensure airflow is even across the coil. FIG. 4 shows how the pads can be rotated to provide a reduced profile to the airflow entering the unit (relative to the base design where the pads shield the heat exchangers), thereby reducing the net airflow resistance and thus increasing airflow for a given fan power. Another embodiment of the design, shown in FIG. 5, would be to have the pads flip upward like gull wing doors during the bypass mode. Increased airflow across the micro channel heat exchangers is achieved which increases heat rejection, and thus, the efficiency of the unit. During this mode, the air bypass is controlled by the control system of the unit. The control system can control each side independently (for systems that operate two separate refrigerant loops operating at different condensing temperatures) or in tandem. The control system has a set point below which the pump deactivates, the pads dry out, and the air temperature entering the heat exchangers becomes that of the ambient dry bulb temperature (as opposed to the temperature of the air entering the heat exchanger in wet operation, when it is an adiabatically reduced temperature somewhere between the ambient dry-bulb and wet-bulb temperatures). Once the pads are dry (as sensed by equal temperatures between the ambient dry bulb temperature and the dry bulb temperature between the pads and coils), the control system rotates the pads outward. Alternately, the system logic can be set that whenever operating dry, the system enters the air bypass mode regardless if the pads are a bit wet. The actuators controlling the swinging pads or dampers may be spring-return to shut the pads in case of a component failure. Users in the art will recognize there are many ways to bypass air around adiabatic pads and are not a limitation of this invention.

This invention also details a cleaning cycle for the unit which can be used to clean the coil of dirt and debris. This cycle can be triggered manually by the user, scheduled to run on a periodic interval, or triggered to run when the coil is sensed to be dirty. During hot ambient periods, a signal will be sent to the refrigeration system to shut down during the cleaning cycle. The cleaning cycle runs the fans in reverse to move air in the opposite direction through the coil. The reversed airflow will push dirt and debris on the face off the coil off toward the pads. This cleaning cycle can be combined with the open swing away pads to allow the dirt to be blown clear of the unit. Alternatively, the pads may remain stationary and wet operation may be enabled to wash any dirt and debris down into the sump where it can be emptied from the unit. The cleaning cycle can also be combined with spray washers in the unit. These spray nozzles would direct water onto the coil to assist in removing dirt and debris from the face of the coil. This spray water would then rinse down into the sump so it can be emptied from the unit. The control system may also be equipped with a sensor that alarms the customer when the pads are dirty and need to be cleaned or changed.

DESCRIPTION OF THE EMBODIMENTS

Figure 1:
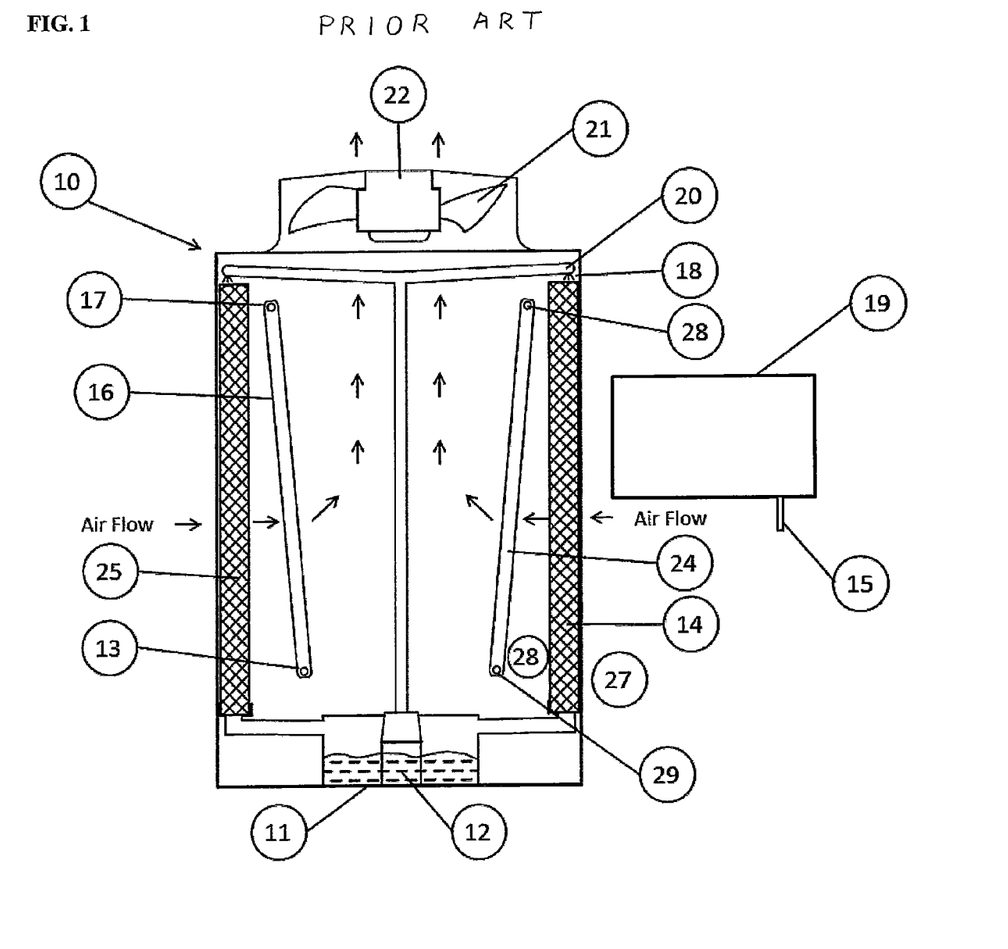
FIG. 1 is a side view of a prior art of an adiabatic condenser or fluid cooler.

Referring now to FIG. 1, a prior art adiabatic condenser or fluid cooler 10 is shown. The product usually has left and right hand side heat transfer coils 16 and 24. Coils 16 and 24 may be in the same or different refrigerant or fluid cooling circuits. Coil 16 has an inlet pipe 17 and outlet pipe 13 as does coil 24 (shown as 28 and 29 respectively). Adiabatic pads 14 and 25 are located outside of the coils 16 and 24 on the ambient fresh air entering the adiabatic condenser 10. Fresh ambient air flows in through the adiabatic pads 14 and 25, then generally crossways and up through the coils 16 and 24 then out through the fan 21 and motor 22 assembly. When ambient air temperature sensor 15 senses a temperature that is above a preselected set point, the water mode is energized regardless of the load on the adiabatic condenser 10 or whether the fans can produce enough cooling without water being used. When the water mode is energized, pump 12 is turned on by the controller in control box 19. Pump 12 pumps water from water sump 11 through spray branches 20 and out of nozzles or orifices 18 then onto the top of adiabatic pads 14 and 25. The evaporative fluid, usually water then flows generally downward through the adiabatic pads and evaporates which cools the incoming air. The optimum performance is the adiabatic pads to drop the adiabatic pad inlet dry bulb temperature to equal the wet bulb temperature. For example, if the ambient outdoor dry bulb temperature at the adiabatic pad inlet is 95 F, and the outdoor ambient wet bulb temperature is 75 F, then the coldest the adiabatic pads could reduce the temperature at the adiabatic pad outlet is 75 F.

Figure 2:
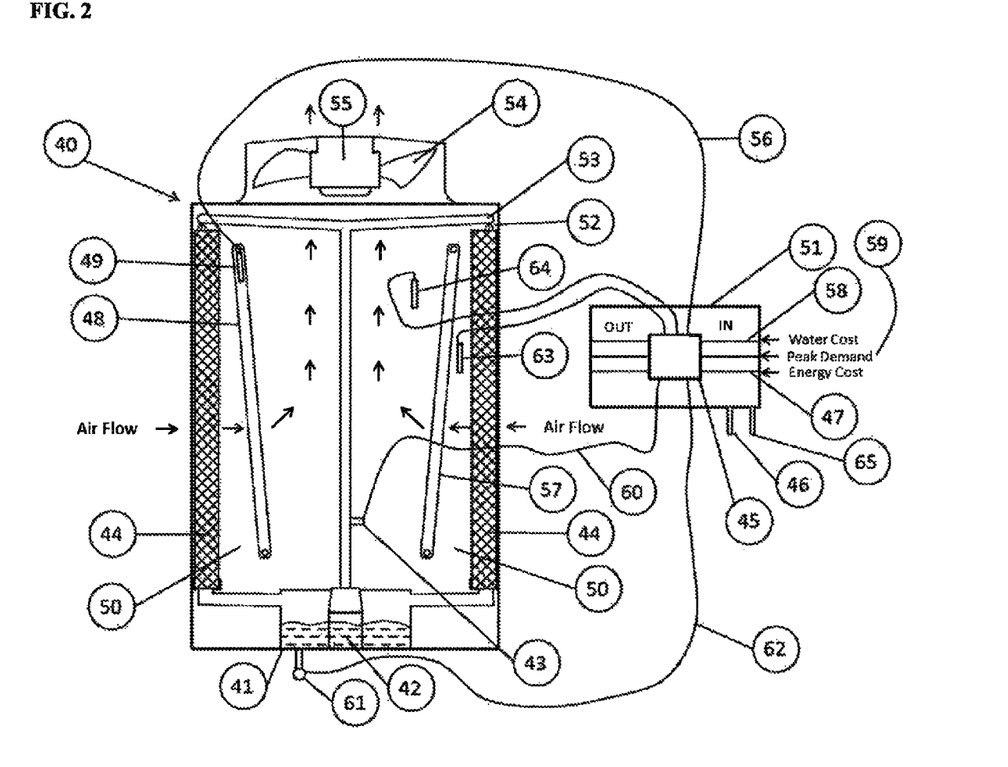
FIG. 2 is a side view of an embodiment of an adiabatic condenser with adiabatic pads and with additional sensors and controls modes.

FIG. 2, shows preferred embodiment of an adiabatic condenser or fluid cooler 40 with advanced controls 45. Controller 45 selectively operates the speed and direction of variable speed motor 55 which drives fan 54 and brings on and off pump 42 to pump water from sump 41 when adiabatic cooling is desired. It should be noted that pump 42 can be replaced with a fresh water supply to supply fresh water to the adiabatic pads and is not a limitation of the invention. It should also be noted that some adiabatic pads are designed to wick water into them and therefore a pump may not be needed in this case and is not a limitation of the invention. It should also be noted that fan motors 55 may be staged so that they be selectively turned off and on separately when not required. A pressure sensor 49 is placed on the inlet (or alternatively on the outlet) of coil 48 to measure and feedback the pressure of the refrigerant via control line 56 back to controller 45. If coil 48 is a fluid cooler, sensor 49 may be a temperature sensor. If the refrigerant in coil 57 is different than coil 48, then two pressure sensors, one for each coil may be used. It should be recognized that units may have single or multiple refrigerant or fluid cooler circuits and is not a limitation of this invention. Temperature sensor location 50 is placed after (meaning on the air inlet side) the adiabatic pads 44 but before coils 48 and 57 to measure air temperature after (meaning on the air outlet side) the adiabatic pads while the temperature sensor 46 measures outdoor ambient air temperature before the adiabatic pads. Alternatively, sensors 46 and 50 may be any type of sensor known in the art, such as an RH sensor, to measure the condition of the air before and after the adiabatic pads. It should be noted that in an effort to save water, even when the water pump could be operated, controller 45 may selectively choose to not operate water pump 42 during ambient conditions which are determined that evaporation is not beneficial, such as when it is raining. Or controller 45 may choose to change the water flow rate to the adiabatic pads or control which pads operate wet and which can operate dry depending on the if the heat exchange performance requirement is being met on one circuit compared to the other. Conductivity (or water quality) sensor 43 measures the conductivity (or quality) of the spray water 52 inside spray water pipes 53 and feeds the signal to controller 45 via sensor wire 60. Sensor 43 may alternatively be mounted in the sump. Controller 45 will control valve 61 via control wire 62 to selectively dump all or some of the water from unit 40 when the conductivity (or water quality) of the water is unacceptable. Control panel 51 contains controller 45 which controls the operation and operating modes of unit 40. Controller 45 may have one or more of inputs 47 (energy cost) 58 (water cost) 59 (peak demand electricity charges) 46 (outdoor ambient temperature) 49 (coil 48 and coil 57 operating pressure) and 50 (air temperature entering coils 48 and 57) to determine which mode of operation to use. Sensor 63, 64 and 65, typically known as pressure sensors, are used by controller 45 to sense when either the adiabatic pads or indirect coils are dirty. When either the pads or indirect coils are sensed as being dirty, controller 45 may send an alarm to the customer.

Figure 3:
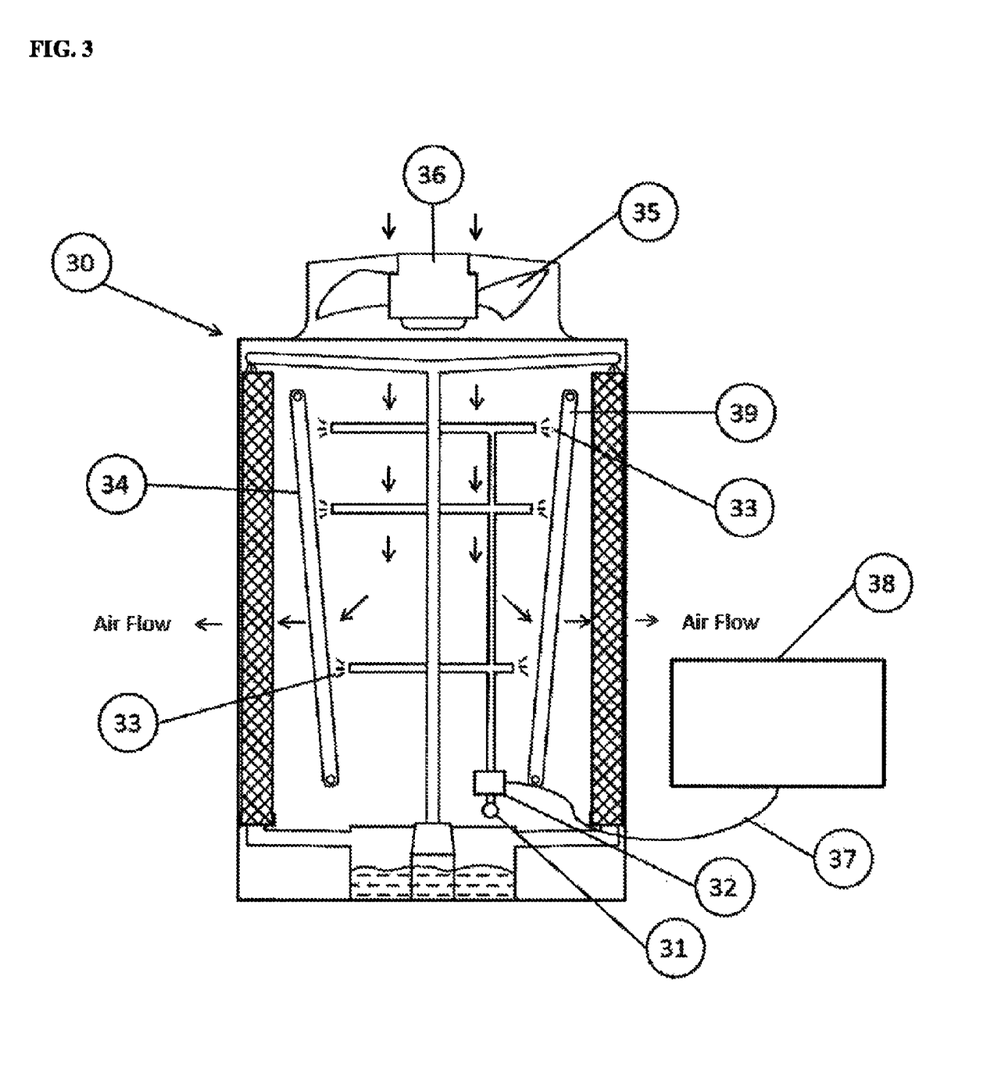
FIG. 3 is a side view of an embodiment of an adiabatic condenser with reversed fans and spray washers to clean the coil.

FIG. 3, shows an improved adiabatic condenser or fluid cooler embodiment 30 which includes a coil cleaning mode. In this embodiment, the airflow may be reversed so it enters through the fan 35 generally downward and is pushed out through the coils 34 and 39 so as to force accumulated dirt deposits back out of the coils. There may also be coil spray washers 33 inside of the unit to spray water directly onto and through coil 34 to assist in washing the accumulated dirt and debris off of coils 34 and 39. A water connection point 31 and a water valve 32 with control wire 37 are provided so fresh water can be piped to the spray washers 33 and controlled selectively with the fan 35 running backwards by reversing motor 36 via controller 38. The coil cleaning mode may run during the cooling mode or can run when there is no demand for cooling.

FIG. 4, shows embodiment of an adiabatic condenser or fluid cooler 70 which includes swing away adiabatic pads 74 (shown open) and 82 (shown closed) so that outdoor ambient air may bypass a majority of adiabatic pads 74 and pass directly to coils 76 and 77 when adiabatic pads 74 and 82 are not needed. Controller 75 selectively operates actuator 86 and 87 via control wires 83 and 84 to move linkages 79 and 80 which can open and close swing away adiabatic pads 74 and 82 when desired. Adiabatic pads 74 and 82 may be opened with actuators, pistons or any other equivalent device It should be noted that the benefits of allowing air to bypass the adiabatic pads are to decrease air pressure drop the fan system sees, thereby increasing the efficiency of the unit during dry operating modes, and also when the adiabatic pads are being bypassed, they will remain cleaner longer.

Figure 5:
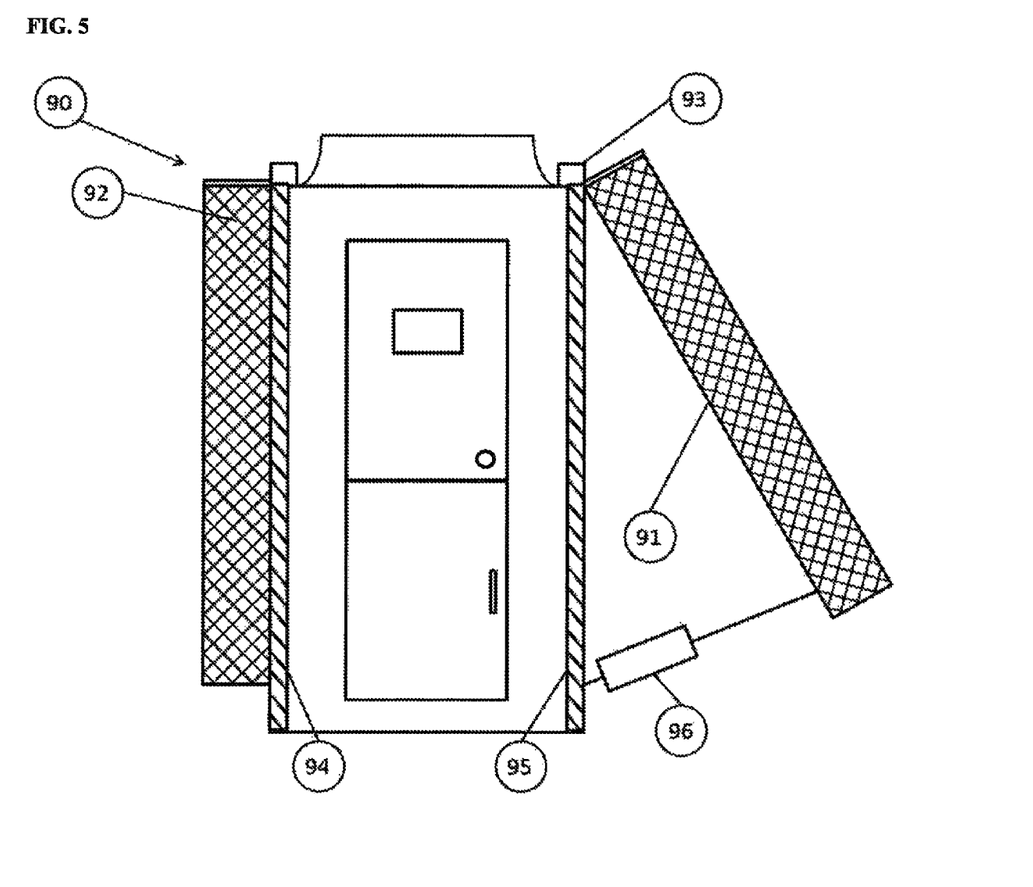
FIG. 5 is a side view of an embodiment of an adiabatic condenser showing louvers that allow air to bypass the pads.

FIG. 5, is another embodiment of an adiabatic condenser or fluid cooler 90 showing swing away pads 91 that shows the pads lifting up out of the way (gull-wing design). In this embodiment, adiabatic pads 91 may be swung away from coils 94 and 95 by piston actuator 96. Adiabatic pads 92 are shown in the closed operating mode. Hinge 93 keeps the top of adiabatic pads connected to embodiment 90.

Figure 6:
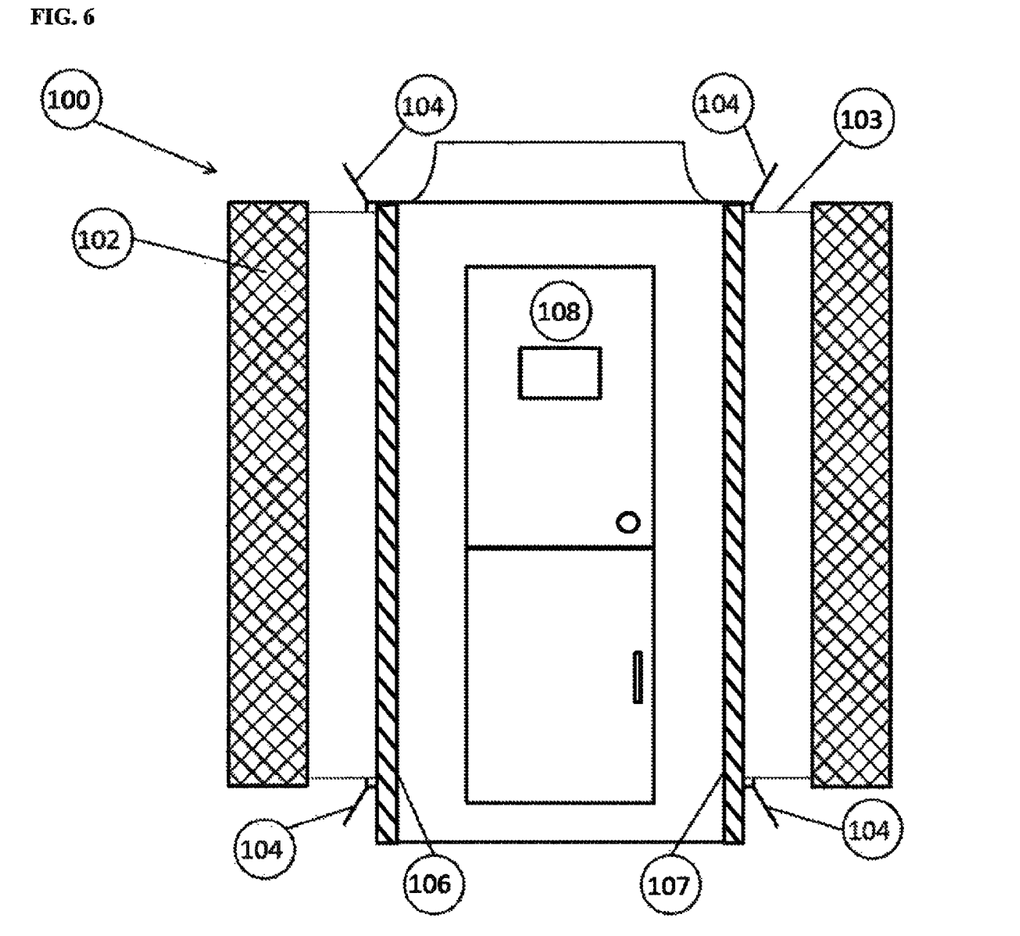
FIG. 6 is a side view of an embodiment of an adiabatic condenser showing swing away pads that swing up instead of to the side.

FIG. 6, shows another embodiment of an adiabatic condenser or fluid cooler 100 that allows the bypass of a majority of outdoor ambient air around adiabatic pads 102 when desired. In this embodiment, adiabatic pads are moved further away from the coils 106 and 107 such that air bypass louvers 104 may be installed and selectively operated by controller 108. During the air bypass mode, air bypass louvers 104 may be selectively opened allowing fresh air to directly enter into coils 106 and 107 through openings 103. FIGS. 4, 5 and 6 show embodiments to bypass fresh air around the adiabatic pads. The adiabatic pads may also be flexible and folded like an accordion or mounted on a flexible track such as a garage door track where the pads are moved out of the way being driven on the track. Users in the art will recognize there are other methods to allow fresh air to bypass the adiabatic pads and is not a limitation of the invention.

Figure 7:
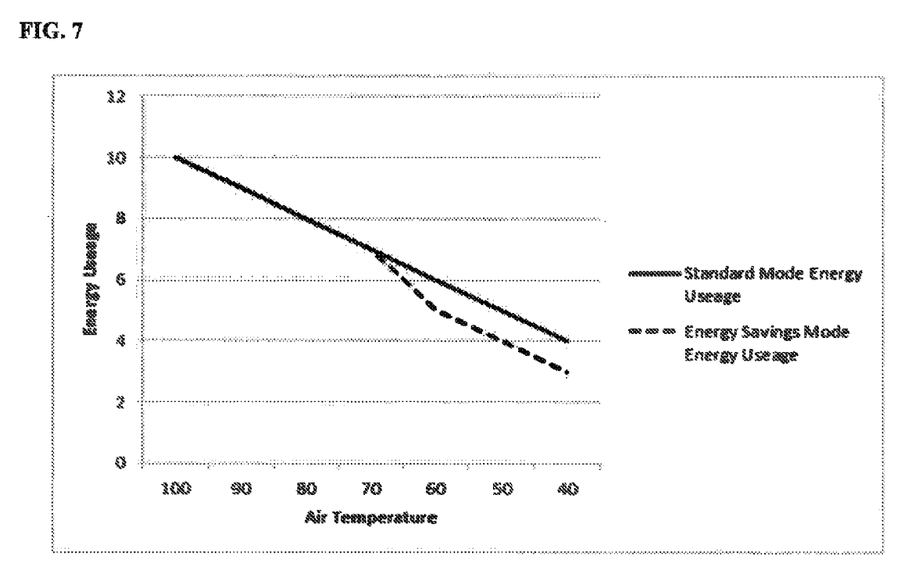
FIG. 7 is a chart showing the energy savings from using "Energy Savings Mode."

FIG. 7, shows the energy saved when operating in energy savings mode. When the unit is not operating at full load it will utilize water passing through the adiabatic pads to cool the incoming air. The cooler incoming air will allow the fan motors to run at a slower speed which will reduce electricity use.

Figure 8:
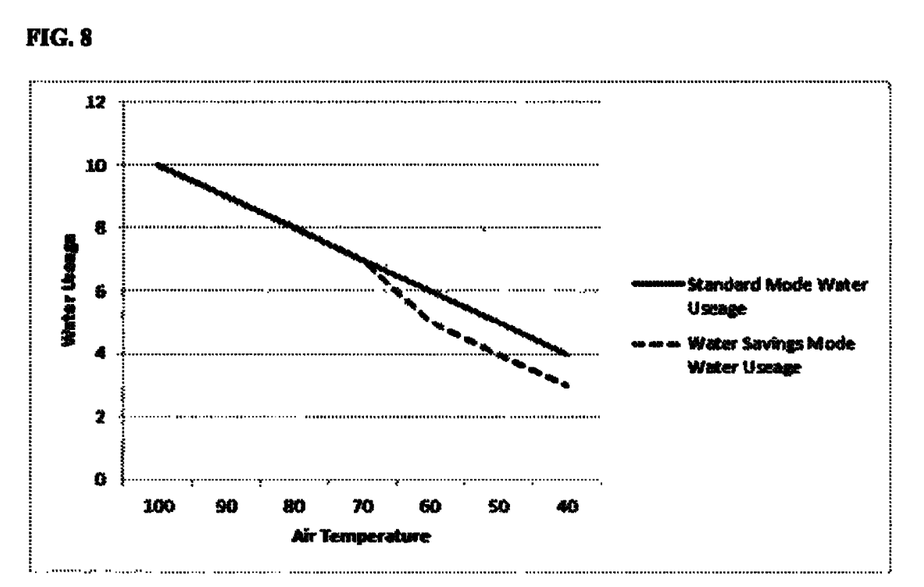
FIG. 8 is a chart showing the water savings from using "Water Savings Mode."

FIG. 8, shows the water saved when operating in water savings mode. When the unit is not operating at full load it will turn the water off to minimize water use.

Figure 9:
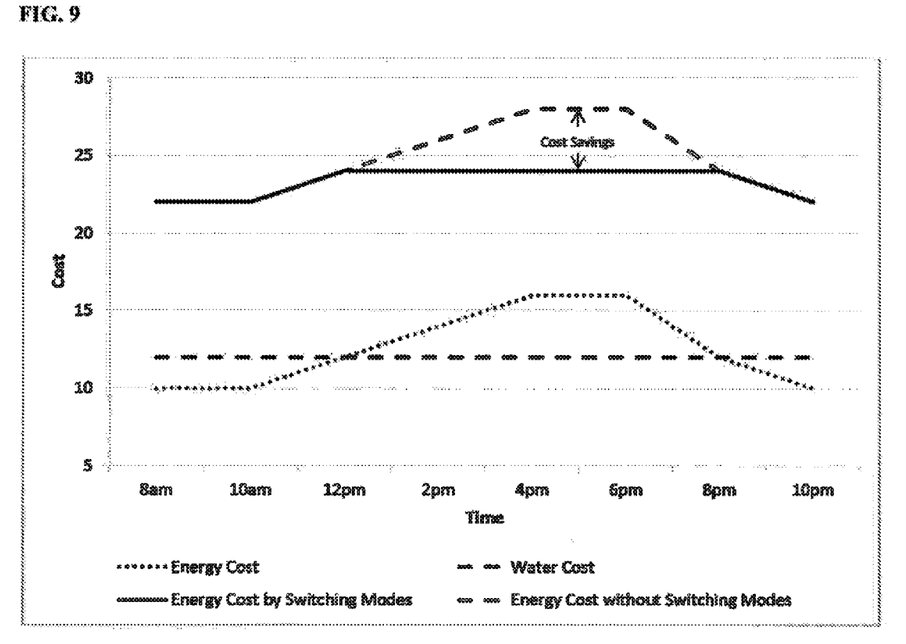
FIG. 9 is a chart showing the cost savings from automatic switching between "Energy Savings Mode" and "Water Savings Mode."

FIG. 9, shows the energy savings by automatically switching modes. This chart shows an example where water costs stay the same in a day but energy costs rise in the afternoon. By switching to energy savings mode the unit can minimize the total energy costs.

Figure 10:
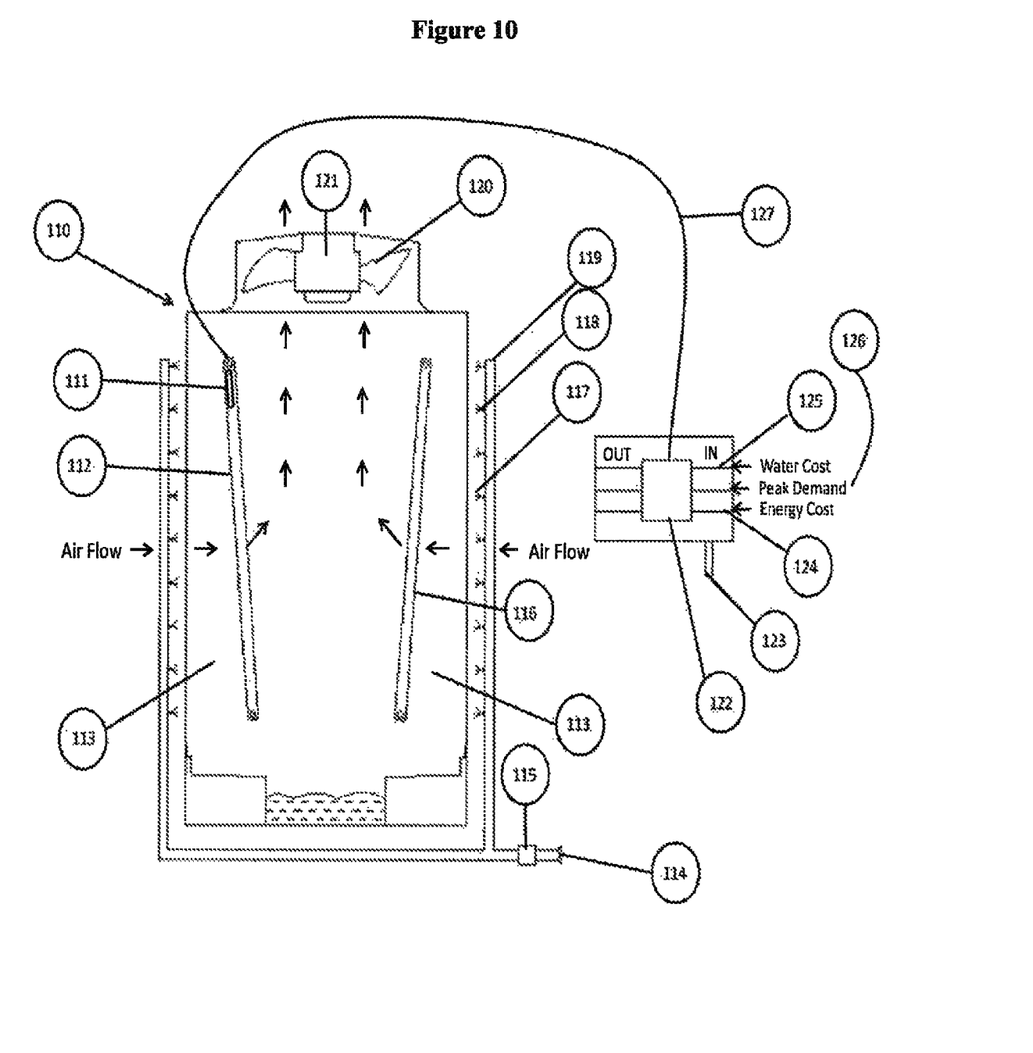
FIG. 10 is a side view of an embodiment of an adiabatic condenser with adiabatic water spray system with additional sensors and control modes.

FIG. 10 shows another embodiment of an adiabatic condenser or fluid cooler 110 that operates much like the embodiment in FIG. 2 except instead of employing adiabatic pads, there is a water spray system which sprays water to evaporate into the air entering the indirect heat exchanger 112 and 116 thereby reducing temperature 113 lower than ambient temperature 123. In this embodiment, water it supplied to water inlet 114. Controller 122 selectively operates valve 115 to allow water to flow through water distribution pipe 119, to nozzles or orifice 118 and to provide mist or spray 117 that evaporates into the air before it enters indirect coil 112 and 116. As the case in the embodiment in FIG. 2, controller 122 receives inputs from 124, energy cost, 125, water cost and 126, peak demand, system operating condition 111 via sensor line 128, air condition at 123 and also at 113 to make a decision on whether to operate in the wet mode and to operate fan 120 at a predetermined fan speed by controlling motor speed of motor 121.

What is claimed is:

1. A heat exchange assembly comprising:
   an indirect heat exchange section,
   an air cooler located adjacent the indirect heat exchange section, the air cooler including a moisture absorbent material,
   a water distribution system arranged to dispense water to the air cooler moisture absorbent material,
   a sump to collect water used by the air cooler,
   a fan powered by a variable speed motor, the variable speed motor configured to operate in a primary mode that draws air through the air cooler into the indirect heat exchange section and moves the air outwardly from the heat exchange assembly, and
   a controller in communication with the water distribution system and the variable speed motor, the controller comprising:
      a first sensing control device configured to monitor an ambient outdoor condition, and
      a second sensing control device configured to monitor a condition of air exiting the air cooler,
   wherein, during operation of the water distribution system, the moisture absorbent material transfers moisture vapor to air drawn through the air cooler so that evaporation of the moisture vapor pre-cools the air that is drawn through the air cooler and into the heat exchanger,
   wherein the controller is configured to control the water distribution system to dispense water based at least in part on the monitored ambient outdoor condition,
   wherein the controller is configured to control the speed of the variable speed motor to adjust the amount of air drawn by the fan based at least in part on the monitored condition of the air exiting the air cooler,
   wherein the air cooler is configured so that the moisture absorbent material is moveable between a first position adjacent the indirect heat exchange section and a second position away from the indirect heat exchange section, the second position arranged to allow the fan to draw air into the indirect heat exchange section while bypassing the air cooler, and
   wherein the controller is configured to automatically move the moisture absorbent material from the first position to the second position when switching operation from a wet to a dry mode.

2. The heat exchange assembly of claim 1, wherein the controller is in communication with the sump, and wherein the controller further includes a third sensing control device configured to monitor a quality parameter of water collected in the sump,
   wherein the controller is configured to effect the release of the water collected in the sump for partial or complete replacement in response to the third sensing control device determining that the water quality parameter exceeds a preselected level.

3. The heat exchange assembly of claim 2, wherein the controller further includes a fourth sensing control device configured to operate heat exchange assembly in a water saving mode, whereby the water saving mode includes operating the variable speed motor driving the fan at a range of speeds that includes a maximum fan speed and stopping the water distribution system from dispensing water to the air cooler moisture absorbing material.

4. The heat exchange assembly of claim 3 wherein the fourth sensing control device is configured to monitor at least one heat exchange performance requirement of the heat exchanger, the controller being further configured to cause the water distribution system to dispense water to at least a portion of the air cooler moisture absorbing material in response to the fan being operated at the maximum fan speed and the fourth sensing control device detecting that a heat exchange performance requirement of the heat exchange assembly is not being met.

5. The heat exchange assembly of claim 1 wherein the variable speed motor is further configured to operate the fan a reverse mode whereby the fan draws air into the heat exchange assembly to blow accumulated debris and dirt from the indirect heat exchange section and from the air cooler.

6. The heat exchange assembly of claim 1 further comprising a bypass configured to allow air to pass around the air cooler moisture absorbent material and to allow fresh air to be drawn directly into the indirect heat exchange section.

7. The heat exchange assembly of claim 1 wherein pads of the air cooler moisture absorbent material are hung from an upper swivel and are rotated about the swivel by the controller.

8. The heat exchange assembly of claim 1 wherein pads of the air cooler moisture absorbent material are supported at an upper edge and a lower edge, and the pads are moved by the controller laterally outwardly from a position adjacent to the indirect heat exchange section.

9. The heat exchange unit of claim 1 wherein the indirect heat exchange section comprises a coil assembly with thermally conductive tubing.

10. The heat exchange assembly of claim 1, wherein the controller further comprises a fifth sensing control device configured to receive information relating to the cost of electricity and to control the variable speed motor and water distribution system based on the information relating to the cost of electricity to provide for efficient operation of the heat exchange assembly.

11. The heat exchange assembly of claim 10 wherein the controller further comprises a sixth sensing control device configured to receive information relating to the cost of water and to control the variable speed motor and water distribution system based on the information relating to the cost of water to provide for efficient operation of the heat exchange assembly.

12. The heat exchange assembly of claim 11 wherein the controller further comprises a seventh sensing control device configured to receive a signal with information pertaining to the cleanliness of the air cooler pads.

13. The heat exchange assembly of claim 12 wherein the controller further comprises an eighth sensing control device configured to receive information pertaining to the cleanliness of the indirect heat exchanger.

14. The heat exchange assembly of claim 1 further comprising a hinge configured to facilitate movement of the moisture absorbent material between the first and second positions.

15. The heat exchange assembly of claim 1, further comprising actuators or pistons configured to facilitate movement of the moisture absorbent material between the first and second positions.

16. The heat exchange assembly of claim 1, further comprising a track configured to facilitate movement of the moisture absorbent material between the first and second positions.

17. The heat exchange assembly of claim 1, wherein the moisture absorbent material comprises a flexible or folded configuration that is configured to facilitate movement of the moisture absorbent material between the first and second positions.

18. The heat exchange assembly of claim 1, wherein the controller is configured so that, upon switching from the wet to the dry mode, the controller waits to switch moisture absorbent material from the first position to the second position until the first and second control devices reach a predetermined level.

19. A heat exchange unit comprising:
an indirect heat exchange section,
an air cooler positioned adjacent the indirect heat exchange section, the air cooler comprising a moisture absorbent material that includes pads,
a water distribution system arranged to dispense water to the air cooler moisture absorbent material,
a sump to collect water used by the air cooler,
fan powered by a variable speed motor configured to draw air through the air cooler into the indirect heat exchange section and outwardly from the heat exchange unit, and
a first sensing control device configured to monitor an ambient outdoor condition,
wherein, during operation of the water distribution system, the moisture absorbent material transfers moisture vapor to air drawn through the air cooler such that the air drawn through the air cooler is cooled and the air drawn over the indirect heat exchange section is precooled,
wherein the first sensing control device is configured to cause the water distribution system to dispense water based at least in part on the monitored ambient outdoor condition, and
wherein the air cooler is configured so that the moisture absorbent material is moveable between a first position adjacent to the indirect heat exchange section and a second position away from the indirect heat exchange section, the second position arranged to allow the fan to draw air into the indirect heat exchange section while bypassing the air cooler.

20. The heat exchange unit of claim 19 further comprising a second sensing control device configured to monitor a condition of air exiting the air cooler and to adjust the speed of the variable speed motor and water distribution system based at least in part on the monitored condition of the air exiting the cooler to adjust the amount of air drawn by the fan.

21. The heat exchange unit of claim 20 further comprising a third sensing control device configured to monitor a quality parameter of water collected in the sump and to effect the release of water collected in the sump for partial or complete replacement in response to determining that the quality parameter exceeds a preselected level.

22. The heat exchange unit of claim 21 further comprising a fourth sensing control device configured to operate the heat exchange unit in a water saving mode whereby the water saving mode includes operating the variable speed motor driving the fan up to maximum speed and stopping the water distribution system from dispensing water to the air cooler moisture absorbing material.

23. The heat exchange unit of claim 22 wherein the fourth sensing control device is configured to monitor at least one heat exchange performance requirement of the heat exchanger, the fourth sensing control device further configured to cause the water distribution system to dispense water to the air cooler moisture absorbing material when the fan is operating at maximum speed and the fourth sensing control device detects that a heat exchange performance requirement of the heat exchange unit is not being met.

24. The heat exchange unit of claim 19 wherein the variable speed motor is further configured to operate the fan in a reverse mode whereby the fan draws air into the heat exchange assembly thereby blowing accumulated debris and dirt from the indirect heat exchange section and from the air cooler.

25. The heat exchange unit of claim 19 wherein the pads of the air cooler moisture absorbent material are hung from an upper swivel and are rotatable about the swivel.

26. The heat exchange unit of claim 19 wherein the pads of the air cooler moisture absorbent material are supported at an upper edge and a lower edge, and the structural pads are movable laterally outwardly from a position adjacent to the indirect heat exchange section.

27. The heat exchange unit of claim 19 wherein the indirect heat exchange section includes a coil assembly with thermally conductive tubing.

28. The heat exchange unit of claim 22 further comprising a fifth sensing control device configured to receive a signal with information relating to the cost of electricity and to control the variable speed motor and water distribution system based on the information relating to the cost of electricity to provide for efficient operation of the heat exchange unit.

29. The heat exchange unit of claim 28 further comprising a sixth sensing control device configured to receive a signal with information relating to the cost of water and to control the variable speed motor and water distribution system based on the information relating to the cost of water to provide for efficient operation of the heat exchange unit.

30. The heat exchange unit of claim 19, wherein the controller is configured to automatically move the moisture absorbent material from the first position to the second position upon switching operation from the wet to the dry mode.

31. The heat exchange unit of claim 19, further comprising a hinge configured to facilitate movement of the moisture absorbent material between the first and second positions.

32. The heat exchange unit of claim 19, further comprising actuators or pistons configured to facilitate movement of the moisture absorbent material between the first and second positions.

33. The heat exchange unit of claim 19, further comprising a track configured to facilitate movement of the moisture absorbent material between the first and second positions.

34. The heat exchange unit of claim 19, wherein the moisture absorbent material comprises a flexible or folded configuration that is configured to facilitate movement of the moisture absorbent material between the first and second positions.

35. The heat exchange unit of claim 19, wherein the controller is configured so that, upon switching from wet to dry operation, the controller waits to switch moisture absorbent material from the first position to the second position until the first and second control devices reach a predetermined level.

36. The heat exchange unit of claim 24, further comprising a water nozzle system configured to spray water onto the indirect heat exchanger when the fans are run in reverse to wash debris off the indirect heat exchanger.

* * * * *